Feb. 28, 1939.  L. D. DRAKE  2,148,445
METHOD AND APPARATUS FOR DIFFUSION CONTROL
Filed Feb. 1, 1937  2 Sheets-Sheet 2
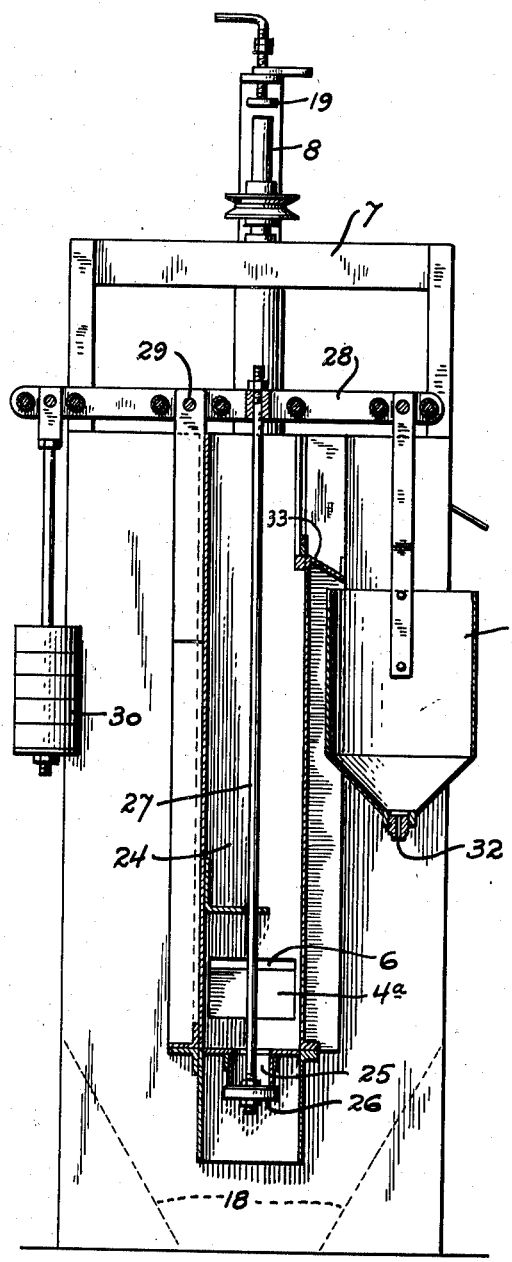
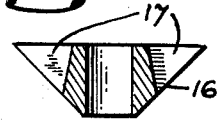
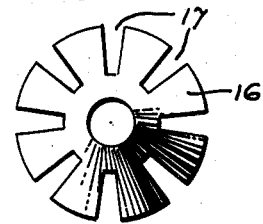
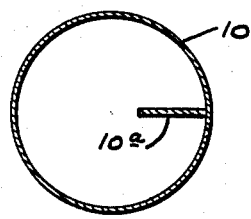
INVENTOR.
Lewis Driver Drake.
BY
Chas. E. Townsend.
ATTORNEY.

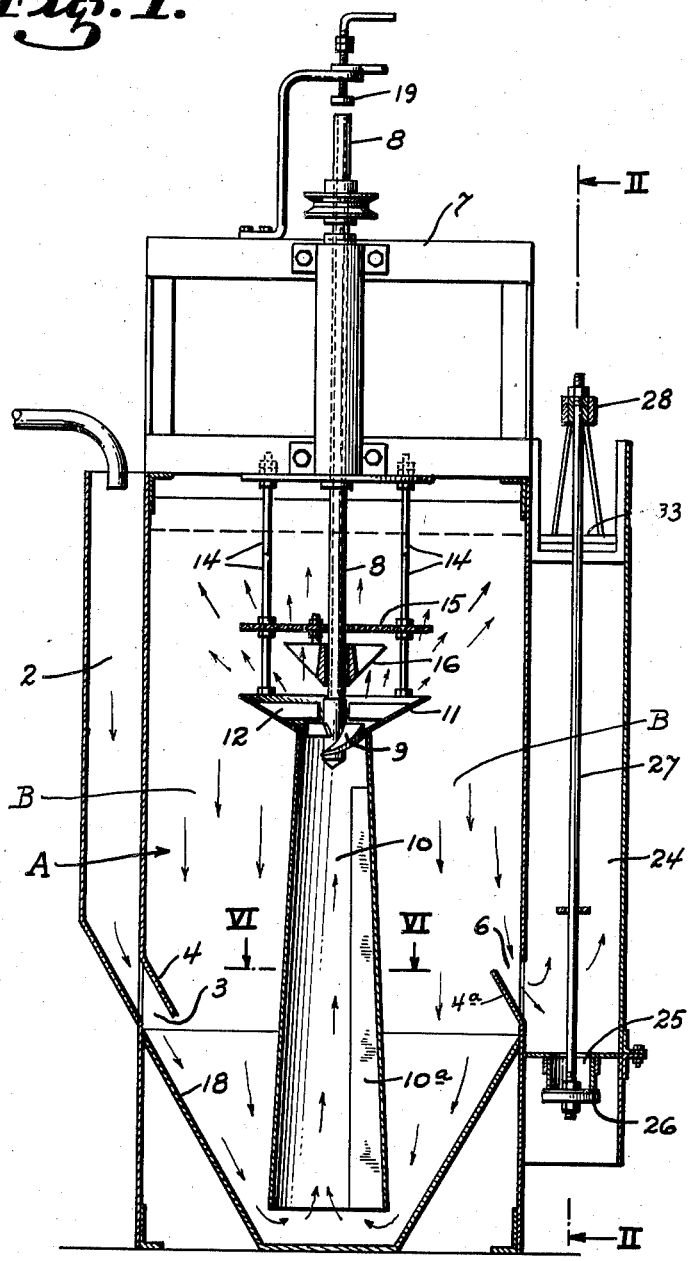

Patented Feb. 28, 1939

2,148,445

UNITED STATES PATENT OFFICE 2,148,445

METHOD AND APPARATUS FOR DIFFUSION CONTROL

Lewis Driver Drake, Mountain View, Calif.

Application February 1, 1937, Serial No. 123,454

19 Claims. (Cl. 209—164)

This invention relates to an improved method and apparatus for the uniform diffusion and mixing of two or more fluid substances, whether in in a liquid or a gaseous form or both, or fluids and solids in suspension.

The object of the present invention is to provide a method and apparatus whereby the efficiency of diffusion of fluids, and fluids and solids in suspension may be materially increased and power consumption materially decreased; to provide a method and apparatus whereby large volumes per cell may be handled and larger cells used; to provide an apparatus in which segregation of pulp or solids in suspension is prevented during their passage through the apparatus; to provide an apparatus wherein the pulp, for instance in a flotation cell, is maintained in constant circulation by dividing the pulp into a central rising column and an exterior descending column; to provide means whereby the rising column is uniformly distributed and diffused under the entire froth area so as to maintain a sufficiently smooth surface to prevent introduction of coarse gangue into the froth and to maintain a uniform supporting bubble column below the entire froth area; to provide means for insuring a uniform pulp level irrespective of variations in feed, and in conjunction therewith, means insuring non-clogging, non-segregating automatic discharge of the pulp; and further, to provide means for reducing the velocity of the descending pulp column to a point where the buoyancy of small or fine air bubbles entrained with the pulp and carried downward therewith will counteract the velocity and thereby gather and combine into sufficiently large bubbles to rise to the froth-gathering surface through the descending column.

One form of apparatus employed is shown by way of illustration in the accompanying drawings in which Fig. 1 is a central vertical longitudinal section of the apparatus;

Fig. 2 is a vertical section taken on line II—II of Fig. 1, said section being at right angles to Fig. 1;

Fig. 3 is a cross-section of the deflector cone;

Fig. 4 is a bottom view of the deflector cone;

Fig. 5 is an enlarged sectional view of a portion of the diffusion plate; and

Fig. 6 is an enlarged cross section of the intake tube taken on line VI—VI, Fig. 1.

Referring to the drawings in detail, and particularly Fig. 1, A indicates a vertically disposed tank or container which may be round, square, rectangular or otherwise shaped in cross section. The pulp to be treated is introduced through a standard feed box 2 and enters the container or tank near the bottom as shown at 3, a diversion plate 4 being disposed above the inlet to deflect the re-circulated pulp away therefrom. The outlet for the pulp is indicated at 6 and connects with an automatic pulp level control mechanism hereinafter to be described.

Disposed above the tank or container is a head frame 7, and journaled therein is a shaft 8 which may be driven from any suitable source of power. Secured on the lower end of the shaft is an impeller 9 which is disposed in the upper end of an intake tube 10. This tube flares from end to end as shown and extends substantially from the bottom of the container to the impeller. While a flaring tube is shown and is particularly desirable on low specific gravity material, a tube of uniform diameter may be used. It is the length of the tube and not the shape that is important. At that point it is provided with a flaring deflector housing 11 which is provided with radial guide blades 12. The deflector 11 and the tube 10 may be supported in any suitable manner, but in this instance is suspended from the overhead frame by rods 14, said rods also supporting a perforated diffusion plate 15 which in turn supports an upwardly flaring deflecting cone 16 in which is formed a plurality of radially disposed slots 17.

In the operation of the apparatus, continuous circulation of the pulp is maintained by the impeller 9, said impeller and the tube 10 separating or dividing the pulp body into two columns, one being a continuous rising central column passing through the tube and the impeller, and the second being a column descending exterior of the tube, and which is deflected by a frusto-conical shaped bottom back into the tube for re-circulation. The primary purpose of the frusto-conical shaped bottom indicated at 18 is to direct the pulp with uniform velocity from all directions radially into the lower end of the tube regardless of the distance between the tube and the cone, and secondly, to provide an area of sufficiently high velocity to prevent settling of the pulp in the bottom of the tank, or what is commonly referred to as "sanding"; further, by insuring uniform velocity from all points radially of the tube, froth-destructive vibration is eliminated. The tube is provided with one or more ribs 10a to prevent swirling of the pulp as it passes upwardly through the same, and in all instances the tube will extend at least one foot below the impeller and will increase in length as the depth of the tank increases. The deflector 11 causes subdivision and expansion of the impeller discharge. The cone 16 causes greater deflection and diffusion and at the same time, due to the slots provided, insures uniform distribution of the entire rising column beneath the froth's surface; that is, it diverts the pulp from the points of over-discharge to points of under-discharge, in one case fitting a conical discharge evenly into a square tank, and it accomplishes this at a comparatively shallow depth. The perforated plate 15 causes further distribution and diffusion of the pulp, and smooths out and extends the action of the deflector cone, and as the perforations are expanded at their upper ends, as clearly shown in Fig. 5, it allows further diffusion at shallower depths.

The air introduced to the pulp is supplied by the shaft 8. This is a tubular shaft, and a valve 19 disposed at the upper end controls the amount of air that enters. The impeller is of the cavitation type and draws air from the shaft through openings formed in the hub and shaft into cavitation pockets formed at the trailing edges of the impeller blades. The air thus introduced is uniformly and thoroughly diffused into the mass of pulp by the revolving blades of the impeller. The pulp discharging from the impeller and deflected and uniformly distributed by the various elements disposed above the same forms a rising column of pulp and air in which the air is uniformly distributed and diffused. This air is known as the supporting bubble column, and from it bubbles are liberated at the surface, and, together with the flotation agents employed, form the froth, collecting and supporting the concentrates. The gangue, together with a certain proportion of finely divided air bubbles entrained with the pulp, forms the descending column. This column, due to the greater space below the deflector 15, and due to what may be termed a partial choking at the inlet or the intake end of the tube, causes a very material slowing down or drop in the velocity of the descending column, and particularly in the area generally indicated at B; in fact, the buoyancy of the entrained air will at this point be sufficient to offset or overcome the effect of downward velocity, and the finely divided air bubbles will thus collect in a zone where they will form such great numbers as to crowd into each other and combine into larger bubbles of sufficient buoyancy to rise to the froth surface through the descending column, thus materially adding to the number of bubbles in the supporting bubble column and at the same time materially reducing the volume of fine air recirculated in the pulp.

In order that the incoming pulp delivered by the feed box shall reach the circulating system or the intake of the tube 10 as directly as possible, the diversion plate 4 is provided. A similar plate 4a is disposed on the discharge side. This plate is directed upwardly and serves the function of diverting a portion of the pulp in the descending column into the pulp discharge. The pulp in the descending column is uniformly suspended, and as it descends and contacts the plate 4a, a certain proportion of the pulp, the coarse particles as well as slimes, will be continuously removed by this plate that diverts the coarse particles which without it would settle by an unguided discharge opening. Segregation and accumulation in the cells of coarse particles to an excessive circulating over-load is thus avoided.

The position of the plate is accordingly important, as it projects a sufficient distance into the descending column to make a non-segregated diversion of pulp to be discharged.

Due to the removal and liberation of air from the descending column, the effect of the supporting bubble column is increased; that is, more froth is produced and a greater recovery of finer concentrates is insured in a shorter period of time. The smaller bubbles containing the finer concentrates, which in many instances constitute the main loss, are in this instance recovered. The removal of the air, furthermore, increases the density of the fluid or pulp passing through the intake tube 10, and the greater the density of the liquid or pulp below the impeller, the greater will be the difference in density above and below the impeller; that is, a great quantity of air is introduced into the discharging column by the impeller, and hence, the greater the difference in density between the incoming column and the discharging column, the greater will be the force feed-action to the impeller, resulting in a lower power consumption.

Experience has shown that the submerged position of a cavitation type impeller has a great bearing on the power factor; that is, if the impeller can be placed comparatively close to the surface of the pulp, comparatively little power and lower speed is required for the introduction of air. On the other hand, if the impeller is deeply submerged or positioned adjacent the bottom of the tank, the power rapidly increases, as a much higher R. P. M. is required to introduce the same quantity of air against the higher hydrostatic head produced.

By the construction here shown, that is, placing the impeller at a shallow depth and employing a long intake tube such as shown at 10, it becomes possible to build tanks or containers of much greater depths than heretofore known, and it also becomes possible to handle much greater volumes of pulp with a materially reduced power factor and higher metallurgical efficiency; also a longer time of contact essential in slow-floating types of ore is made possible. The use of a long intake tube has been made possible in the structure here shown because of the type of impeller employed, that is, an impeller having large volume, low pressure, positive displacement pumping characteristics.

In the present apparatus there is a constant discharge of pulp due to the use of the diversion plate 4a and its discharge opening. This plate, as previously stated, prevents segregation of the pulp as it diverts equally the coarse and fine particles of the pulp. This is also important when the power factor of the machine is considered, as it prevents segregation and thereby the building up of a heavier circulating load.

The deflector 11, the cone 16, and the perforated plate 15 are of great importance, as they serve the function of distributing and dispersing the pulp and air diffused therein uniformly beneath the froth-gathering surface. These members bring about such a uniform distribution that they may be placed close to the surface of the pulp. In most instances, it is found that they may be placed within 15 to 20 inches of the surface, thus making it possible to introduce the air at a point where the hydrostatic head produced by the pulp is practically nil, which accounts for the low power consumption of the apparatus. With this arrangement, it also becomes possible to place the impeller at a point close to the surface, thereby permitting use of a comparatively short impeller shaft with ample space for overhead bearings, obviating the use of a submerged bearing which has been a limiting factor in depth and large volume work. In addition to the above, the vertical tube which confines and directs the central column of pulp to the impeller may be extended downwardly to almost any depth desired without any perceptible increase in power consumption, as the central or rising column of pulp is substantially balanced by the exterior or descending column; hence, the only power increase encountered when increasing the depth of a tank will be that caused by friction, and that would obviously be negligible.

The employment of a deep tank increases the time of contact, an obvious advantage when slow-floating ores are treated, and when chemical reactions are considered, such as the aeration of cyanide solutions, etc., increased efficiency is insured. Greater depth also increases metallurgical recovery in flotation operations, as the greater the distance a fine bubble travels, the greater the chance of encountering metal particles and floating them to the surface. The vertically disposed deep tank furthermore decreases floor space, and also the number of cells or tanks required for a given operation.

The apparatus described is employed for flotation concentration, but there are many operations in the metallurgical, chemical, biological and industrial fields which require thorough diffusion and mixing of one or more fluid substances, or fluids and solids. Among these operations, flotation has been referred to as an illustration. Other possible operations are cyanidation, aeration of water, sewage and yeast malts, carbonization of sugar beet juices, and saline solutions in the manufacture of certain alkalis, etc. The method and apparatus described may be efficiently employed in these and other arts.

In the operation of the apparatus herein disclosed, particularly when applied to ore flotation, it is found to be essential to maintain a uniform pulp level irrespective of fluctuations in the feed volume, and to insure automatic removal of the non-segregated discharging pulp. The pulp in this apparatus is uniformly suspended in the descending column; that is, the coarse and fine particles are all in suspension. Hence, by using the diversion plate 4a, a certain proportion of the pulp may be continuously removed without any danger of segregation as the coarse and finer particles will be deflected outwardly through the discharge opening without segregation. The liquid and solid matter thus discharged collects in a discharge chamber generally indicated at 24. In the bottom of this chamber is formed a discharge outlet 25 which is controlled by the valve 26. The valve is secured on the end of a rod 27 suspended at its upper end from a beam 28 which is pivoted at 29. On one end of the beam is hung a counterweight 30, and on the opposite end a container 31, having a discharge outlet 32. The pulp entering the discharge chamber 24 rises therein until it overflows a weir 33. This may be adjustable vertically so as to maintain any pulp level desired. As the pulp overflows, it enters the receptacle 31 and discharges from the lower end thereof. In operation, a balance is struck between the receptacle 31 and the counterweight 30, causing the valve 32 to assume an open position sufficient to take care of the discharging pulp. This apparatus will ordinarily maintain a uniform pulp level irrespective of feed variations.

This apparatus is superior in accuracy to float-controlled devices of a similar nature due to the greater force brought to bear on the valve 26 by slight changes in flow due to heavy diversion of the pulp into the receptacle or bucket 31 by a long overflow weir by slight changes in depth. This weighted bucket permits more accurate regulation and control of the valve 26 than any reasonably sized float mechanism heretofore used by slight feed and pulp-level operation variations.

While this and other features of the present invention have been more or less specifically described and illustrated, I wish it understood that various changes may be resorted to within the scope of the appended claims and that the materials and finish of the several parts employed may be such as the manufacturer may decide, or varying conditions or uses may demand.

Having thus described my invention, what I claim and desire to secure by Letters Patent is—

1. In an apparatus of the character described a vertical tank for the reception of a liquid, a tube vertically disposed in the tank and extending from a point adjacent the bottom of the tank upwardly toward the surface of the liquid, means for maintaining the liquid circulating in a column upwardly through the tube and in a descending column exterior of the tube, and deflector means disposed above the tube for uniformly distributing and dispersing the liquid in the rising column beneath the surface of the liquid, said means comprising an upwardly flaring cone-shaped member centrally disposed above the tube, said cone having a plurality of radially disposed slots formed therein.

2. In an apparatus of the character described a vertical tank for the reception of a liquid, a tube vertically disposed in the tank and extending from a point adjacent the bottom of the tank upwardly toward the surface of the liquid, means for maintaining the liquid circulating in a column upwardly through the tube and in a descending column exterior of the tube, deflector means disposed above the tube for uniformly distributing and dispersing the liquid in the rising column beneath the surface of the liquid, said means comprising an upwardly flaring cone-shaped member centrally disposed above the tube, said cone having a plurality of radially disposed slots formed therein, and a perforated plate disposed above the cone, the perforations in said plate being flaring and cone-shaped at their upper ends.

3. In an apparatus of the character described a vertically disposed tank for the reception of a liquid, said liquid having solid matter suspended therein and said tank having means for maintaining the liquid in continuous circulation with the solid matter uniformly suspended in the liquid, and said tank having an inlet and an outlet opening formed therein, and a submerged upwardly flaring plate disposed adjacent the outlet to continuously direct the liquid and unsegregated solid matter to and through said outlet, at any point above the bottom.

4. In an apparatus of the character described a vertically disposed tank for the reception of a liquid having solid matter suspended therein, and said tank having means for maintaining the liquid in continuous circulation with the solid matter suspended in the liquid, and said tank having an inlet and an outlet opening formed therein, a discharge housing connected with the outlet in which the liquids and solids are received, a discharge weir forming an overflow for said housing and maintaining a predetermined liquid level in said housing and in the tank, a beam pivotally supported intermediate its ends above the level of the liquid, a bucket suspended from one end of the beam, said bucket receiving the overflow from the weir and having a restricted discharge opening to permit gradual escape of the overflow collected in the bucket, an adjustable weight on the other end of the beam to counter-balance the bucket, and a discharge valve in the housing actuated by the beam and being opened and closed thereby, said valve being supported and actuated by a rod connecting the valve directly with the beam, said rod and valve being subject to vertical movement only.

5. In an apparatus of the character described a tank for the reception of a liquid, liquid impelling means in the tank below but adjacent the surface of the liquid and above the major portion of the liquid, means cooperating with the impelling means for introducing a fluid to be diffused throughout the liquid, an elongated passage extending from the impelling means downwardly to a point adjacent the bottom of the tank, to form a top diffusion zone above the liquid impelling means, a small elongated zone of upward fast liquid movement in said passage and a larger zone of slow substantially uniform downward pulp movement below the impelling means and said larger zone containing the major portion of the liquid and permitting small froth-forming gas bubbles held in the downwardly flowing column to assert their buoyancy and to gather and combine into large enough bubbles to rise through the downwardly flowing column and gather with the primary froth, the lower portion of the tank formed to provide a lower pick-up zone of progressively increasing velocity to the tank bottom, from which the small zone of upward fast liquid movement returns the liquid to the impelling means for recirculation.

6. In an apparatus of the character described a tank for the reception of a liquid, a cavitation impeller in the tank below but adjacent the surface of the liquid and above the major portion of the liquid, means cooperating with the impeller for introducing a fluid to be diffused throughout the liquid, an elongated passage extending from the impeller downwardly to a point adjacent the bottom of the tank to form a top diffusion zone above the impeller, a small elongated zone of upward fast liquid movement in said passage and a larger zone of slow substantially uniform downward pulp movement below the impeller and said larger zone containing the major portion of the liquid and permitting small froth-forming gas bubbles held in the downwardly flowing column to assert their buoyancy and to gather and combine into large enough bubbles to rise through the downwardly flowing column and gather with the primary froth, the lower portion of the tank formed to provide a lower pick-up zone of progressively increasing velocity to the tank bottom, from which the small zone of upward fast liquid movement returns the liquid to the impeller for recirculation.

7. In an apparatus of the character described a tank for the reception of a liquid, liquid impelling means in the tank below but adjacent the surface of the liquid, and above the major portion of the liquid, means cooperating with the impelling means for introducing a fluid to be diffused throughout the liquid, deflector means cooperating with the impelling means to uniformly distribute the impelling means discharge evenly beneath the surface of the liquid, an elongated passage extending from the impelling means downwardly to a point adjacent the bottom of the tank to form a top diffusion zone, a small elongated zone of upward fast liquid movement in said passage and a larger zone of slow substantially uniform downward pulp movement below the impelling means and said larger zone containing the major portion of the liquid and permitting small froth-forming gas bubbles held in the downwardly flowing column to assert their buoyancy and to gather and combine into large enough bubbles to rise through the downwardly flowing column and gather with the primary froth, the lower portion of the tank formed to provide a lower pick-up zone of progressively increasing velocity to the tank bottom, from which the small zone of upward fast liquid movement returns the liquid to the impelling means for recirculation.

8. In an apparatus of the character described a tank for the reception of a liquid, liquid impelling means in the tank below but adjacent the surface of the liquid, and above the major portion of the liquid, means cooperating with the impelling means for introducing a fluid to be diffused throughout the liquid, diffusion means disposed above the impelling means and cooperating therewith to uniformly diffuse the impelling means discharge evenly and upwardly beneath the surface of the liquid, an elongated passage extending from the impelling means downwardly to a point adjacent the bottom of the tank to form a top diffusion zone above the liquid impelling means, a small elongated zone of upward fast liquid movement in said passage and a larger zone of slow substantially uniform downward pulp movement below the impelling means and said larger zone containing the major portion of the liquid and permitting small froth-forming gas bubbles held in the downwardly flowing column to assert their buoyancy and to gather and combine into large enough bubbles to rise through the downwardly flowing column and gather with the primary froth, the lower portion of the tank formed to provide a lower pick-up zone of progressively increasing velocity to the tank bottom, from which the small zone of upward fast liquid movement returns the liquid to the impelling means for recirculation.

9. In an apparatus of the character described a tank for the reception of a liquid, liquid impelling means in the tank below but adjacent the surface of the liquid, and above the major portion of the liquid, means cooperating with impelling means for introducing a fluid to be diffused throughout the liquid, diffusion means disposed above the impelling means and cooperating therewith to uniformly diffuse the impelling means discharge evenly and upwardly beneath the surface of the liquid, said diffusion means comprising an upwardly flaring cone-shaped member centrally disposed above the impelling means, said cone-shaped member having a plurality of radially disposed slots formed therein, an elongated passage extending from the impelling means downwardly to a point adjacent the bottom of the tank to form a top diffusion zone above the liquid impelling means, a small elongated zone of upward fast liquid movement in said passage and a larger zone of slow substantially uniform downward pulp movement below the impelling means and said larger zone containing the major portion of the liquid and permitting small froth-forming gas bubbles held in the downwardly flowing column to assert their buoyancy and to gather and combine into large enough bubbles to rise through the downwardly flowing column and gather with the primary froth, the lower portion of the tank formed to provide a lower pick-up zone of progressively increasing velocity to the tank bottom, from which the small zone of upward fast liquid movement returns the liquid to the impelling means for recirculation.

10. In an apparatus of the character described, a tank for the reception of a liquid, liquid impelling means in the tank below but adjacent the surface of the liquid, and above the major portion of the liquid, means cooperating with the impelling means for introducing a fluid to be diffused throughout the liquid, diffusion means disposed above the impelling means and cooperating therewith to uniformly diffuse the impelling means discharge evenly and upwardly beneath the surface of the liquid, said diffusion means comprising an upwardly flaring cone shaped member centrally disposed above the impelling means, said cone-shaped member having a plurality of radially disposed slots formed therein and a perforated plate disposed above the cone-shaped member, an elongated passage extending from the impelling means downwardly to a point adjacent the bottom of the tank to form a top diffusion zone above the liquid impelling means, a small elongated zone of upward fast liquid movement in said passage and a larger zone of slow substantially uniform downward pulp movement below the impelling means and said larger zone containing the major portion of the liquid and permitting small froth-forming gas bubbles held in the downwardly flowing column to assert their buoyancy and to gather and combine into large enough bubbles to rise through the downwardly flowing column and gather with the primary froth, the lower portion of the tank formed to provide a lower pick-up zone of progressively increasing velocity to the tank bottom, from which the small zone of upward fast liquid movement returns the liquid to the impelling means for recirculation.

11. In an apparatus of the character described, a tank for the reception of a liquid, liquid impelling means in the tank below but adjacent the surface of the liquid, and above the major portion of the liquid, means cooperating with the impelling means for introducing a fluid to be diffused throughout the liquid, diffusion means disposed above the impelling means and cooperating therewith to uniformly diffuse the impelling means discharge evenly and upwardly beneath the surface of the liquid, said diffusion means comprising an upwardly flaring cone-shaped member centrally disposed above the impelling means, said cone-shaped member having a plurality of radially disposed slots formed therein and a perforated plate disposed above the cone-shaped member, the perforations in said plate being flaring and cone-shaped at their upper ends, an elongated passage extending from the impelling means downwardly to a point adjacent the bottom of the tank to form a top diffusion zone above the liquid impelling means, a small elongated zone of upward fast liquid movement in said passage and a larger zone of slow substantially uniform downward pulp movement below the impelling means and said larger zone containing the major portion of the liquid and permitting small froth-forming gas bubbles held in the downwardly flowing column to assert their buoyancy and to gather and combine into large enough bubbles to rise through the downwardly flowing column and gather with the primary froth, the lower portion of the tank formed to provide a lower pick-up zone of progressively increasing velocity to the tank bottom, from which the small zone of upward fast liquid movement returns the liquid to the impelling means for recirculation.

12. In an apparatus of the character described, a tank for the reception of a liquid, liquid impelling means in the tank below but adjacent the surface of the liquid, and above the major portion of the liquid, an elongated tube extending from the impelling means downwardly through the major portion of the liquid to a point adjacent the bottom of the tank, to cause circulation of the liquid upwardly through the tube and downwardly exterior of the tube, said tube having a rib extending lengthwise thereof to prevent swirling of the liquid in the tube, said tank having its major portion extending below the impelling means to contain the major portion of the liquid, and the cross-sectional area of the tube being so small in comparison with the cross-sectional area of the tank that upward circulation through the tube will be rapid and downward recirculation exterior of the tube will be slow.

13. In an apparatus of the character described a tank for the reception of a liquid, liquid impelling means in the tank below but adjacent the surface of the liquid, and above the major portion of the liquid, an elongated tube extending from the impelling means downwardly through the major portion of the liquid to a point adjacent the bottom of the tank, to cause circulation of the liquid upwardly through the tube and downwardly exterior of the tube, means cooperating with the impelling means for introducing a fluid to be diffused throughout the liquid, said tank having its major portion extending below the impelling means to contain the major portion of the liquid, the cross-sectional area of the tube being so small in comparison with the cross-sectional area of the tank that upward circulation through the tube will be rapid and downward circulation exterior of the tube will be slow, and an annular tapering contracted bottom in the tank cooperating with the lower end of the tube to cause the liquid to enter the tube from all radial directions with uniform velocity.

14. A method of concentrating ore pulps by flotation concentration which comprises flowing the pulp to be treated in a body, maintaining the pulp in continuous circulation upwardly in an elongated column of small cross-sectional area of the body to a point below but adjacent the upper surface of the pulp, and downwardly in an elongated column of large area of the body, introducing and uniformly diffusing a gas with the upwardly circulating column of the pulp, to produce a primary mineral-gathering froth, said body having its major portion extending below the diffusion zone, and said downwardly circulating portion of the body presenting a cross-sectional area below the diffusion zone so large, in proportion to the cross-sectional area of the column of vertically circulating pulp, that the velocity of the ascending column will be high and the velocity in the downwardly flowing column will be sufficiently low to permit small froth-forming gas bubbles held therein to assert their buoyancy and to gather and combine into large enough bubbles to rise through the downwardly flowing column and gather with the primary froth; and recovering the combined froths.

15. A method of concentrating ore pulps by flotation concentration which comprises flowing the pulp to be treated in a body, maintaining the pulp in continuous circulation upwardly in an elongated column of small cross-sectional area of the body and downwardly in an elongated column of large area of the body, introducing and uniformly diffusing a gas with the upwardly circulating column of the pulp at a point below but adjacent the upper surface of the pulp, to produce a primary mineral-gathering froth, said body having its major portion extending below the point of gas introduction and said downwardly circulating portion of the body presenting a cross-sectional area below the point of gas introduction so large, in proportion to the cross-sectional area of the column of upwardly circulating pulp, that the velocity of the ascending column will be high and the velocity in the downwardly flowing column will be sufficiently low and the length thereof sufficiently great to permit small froth-forming gas bubbles held therein to assert their buoyancy and to gather and combine into large enough bubbles to rise through the downwardly flowing column and gather with the primary froth; and recovering the combined froths.

16. A method of concentrating ore pulps by flotation concentration which comprises flowing the pulp to be treated in a body, maintaining the pulp in continuous circulation upwardly in an elongated column of small cross-sectional area of the body and downwardly in an elongated column of large area, introducing and uniformly diffusing a gas with the upwardly circulating column of the pulp at a point below but adjacent the upper surface of the pulp, to produce a primary mineral-gathering froth, said body having its major portion extending below the point of gas introduction, and said downwardly circulating portion of the body presenting a cross-sectional area below the point of gas introduction so large, in proportion to the cross-sectional area of the column of vertically circulating pulp, that the velocity of the ascending column will be high and will pick up and recirculate all pulp reaching the bottom of the body, and the velocity of the downwardly flowing column will be sufficiently low and the length thereof sufficiently great to permit small froth-forming gas bubbles held therein to assert their buoyancy and to gather and combine into large enough bubbles to rise through the downwardly flowing column and gather with the primary froth; and recovering the combined froths.

17. A method of concentrating ore pulps by flotation concentration which comprises flowing the pulp to be treated in a body, maintaining the pulp in continuous circulation upwardly in an elongated column of small cross-sectional area of the body and downwardly in an elongated column of large area, introducing and uniformly diffusing a gas with the upwardly circulating column of the pulp at a point below but adjacent the upper surface of the pulp, to produce a primary mineral-gathering froth, said body having its major portion extending below the point of gas introduction, and said downwardly circulating portion of the body presenting a cross-sectional area below the point of gas introduction so large, in proportion to the cross-sectional area of the column of upwardly circulating pulp, that the velocity of the ascending column will be high and will pick up and recirculate all pulp reaching the bottom of the body, and the velocity of the downwardly flowing column will be sufficiently low and the length thereof sufficiently great to permit small froth-forming gas bubbles held therein to assert their buoyancy and to gather and combine into large enough bubbles to rise through the downwardly flowing column and gather with the primary froth; increasing the velocity of the downwardly flowing column at the bottom of the body to direct all settling pulp to the ascending column to be recirculated, and recovering the combined froths.

18. A method of concentrating ore pulps by flotation concentration which comprises flowing the pulp to be treated in a body, maintaining the pulp in continuous circulation upwardly in an elongated column of small cross-sectional area of the body and downwardly in an elongated column of large area, introducing and uniformly diffusing a gas with the upwardly circulating column of the pulp at a point below but adjacent the upper surface of the pulp, to produce a primary mineral-gathering froth, said body having its major portion extending below the point of gas introduction, and said downwardly circulating portion of the body presenting a cross-sectional area below the point of gas introduction so large, in proportion to the cross-sectional area of the column of vertically circulating pulp, that the velocity of the ascending column will be high and will pick up and recirculate all pulp reaching the bottom of the body, and the velocity of the descending column will be sufficiently low and the length thereof sufficiently great to permit small froth-forming gas bubbles held therein to assert their buoyancy and to gather and combine into large enough bubbles to rise through the downwardly flowing column and gather with the primary froth; increasing the velocity of the downwardly flowing column at the bottom of the body to direct all settling pulp to the ascending column to be recirculated, continuously directing incoming pulp to a point adjacent the lower end of the high velocity ascending column and continuously discharging unsegregated pulp and thereby eliminating coarse particle accumulation in the body, and recovering the combined froths.

19. In an apparatus of the character described, a tank for the reception of a liquid, liquid impelling means in the tank below but adjacent the surface of the liquid, and above the major portion of the liquid, an elongated tube extending from the impelling means downwardly through the major portion of the liquid to a point adjacent the bottom of the tank, to cause circulation of the liquid upwardly through the tube and downwardly exterior of the tube, said tube having a length at least as great as three times the outside diameter of the impelling means, said tank having its major portion extending below the impelling means to contain the major portion of the liquid, and the cross-sectional area of the tube being so small in comparison with the cross-sectional area of the tank that upward circulation through the tube will be rapid and downward recirculation exterior of the tube will be slow.

LEWIS DRIVER DRAKE.